Patented May 10, 1949

2,470,065

UNITED STATES PATENT OFFICE 2,470,065

EMULSION POLYMERIZATION OF BUTADIENES

Carl E. Barnes, Belvedere, N. J., assignor to General Aniline & Film Corporation, New York, N. Y., a corporation of Delaware No Drawing. Application August 11, 1944, Serial No. 549,115

9 Claims. (Cl. 260—23.7)

This invention relates to improvements in the polymerization of butadienes and mixtures thereof with polymerizable vinyl compounds in aqueous emulsion.

The aqueous emulsion polymerization of butadienes or mixtures thereof with polymerizable vinyl compounds in the presence of soluble soaps as emulsifying agents and of a polymerization catalyst is known. The reaction is relatively slow and in order to increase the rate of polymerization resort has been had to the use of large amounts of soap. This measure has the drawback that removal of all of the soap from the solid rubbery polymer is very difficult.

I have found that the aqueous emulsion polymerization of butadienes or mixtures thereof with polymerizable vinyl compounds using soap as emulsifier may be substantially accelerated without employing large amounts of soap when it is carried out in the presence of an inert water-soluble organic solvent for the soap.

Suitable soaps are the soluble salts of the fatty acids having at least 12 carbon atoms, e. g. the sodium or ammonium salts of lauric, myristic, palmitic, oleic, linoleic, linolenic or ricinoleic acids, etc. Soaps of the fatty acids lower in the series are not suitable as they are too soluble for good emulsifying power and the use of the solvent therewith will result in lowering the yield of the solid rubbery polymer obtainable. A preferred group of soaps are those of the fatty acids having from 12 to 18 carbon atoms, preferably those of the saturated fatty acids having from 12 to 16 carbon atoms and those of the unsaturated fatty acids having 18 carbon atoms.

The essential function of the solvent in my process appears to be that of increasing the solubility of the soap in the aqueous phase, hence its effective concentration in the polymerization mixture and thereby its capacity to promote the polymerization reaction. Organic compounds insoluble in water such as benzene and chlorobenzene are without effect on the rate of the polymerization. Compounds which are acid or acid reacting in the process are obviously unsuitable due to the risk of incurring premature coagulation of the emulsion. Likewise solvents which are reactive to inhibit the polymerization, such as amino and phenolic compounds, are also undesirable. Accordingly, the solvents employed in the present process should be non-inhibiting as well as non-acidic and in this respect they are defined herein as inert. Suitable solvents are, for example, methyl, ethyl, n-propyl and isopropyl alcohols, glycidol, acetone, ethylene glycol, the monomethyl, monoethyl, monopropyl and monobutyl ethers of ethylene glycol, the monomethyl and monoethyl ethers of diethylene glycol, the diethyl ether of diethylene glycol, dioxane, glycerol, etc.

The addition of the solvent suitably is made by adding it to the mixture of the substance to be polymerized, water and soap. The amount of solvent added may vary. In general, about 5–10% by volume on the total liquid volume of the emulsion will be found sufficient. The process, otherwise, is carried out in accordance with known procedure. Catalysts of the oxidizing type may be employed such as persulfates, e. g. ammonium persulfate, organic peroxides, e. g. benzoyl peroxide, or hydrogen peroxide.

The process may be applied to the various butadienes-1.3, such as butadiene, isoprene, 2.3-dimethyl butadiene, piperylene and 2-chlorobutadiene. The term "butadienes" as used herein is intended to include the substituted butadienes-1.3 as well as butadeine itself. Vinyl compounds copolymerizable with butadienes are, for example, styrene, acrylonitrile, vinylpyridine, etc.

The invention is further illustrated by the following specific examples to which, however, it is not to be limited. Parts are by weight unless otherwise indicated.

Example 1

38 parts by volume of water, 24 parts by volume of 3% aqueous hydrogen peroxide, 100 parts by volume of 5% ammonium oleate aqueous solution, 20 parts of styrene and 60 parts of butadiene were shaken in a closed reaction vessel at 60–65° C. for 9 hours. After the addition of dilute (3%) acetic acid to the reaction mass an oily product resulted. Conducting the reaction for 96 hours a solid rubbery polymer was obtained.

Working under the same conditions but with the addition of 12 parts by volume of acetone (5% on the total volume of the liquid in the emulsion) a solid rubbery polymer suitable for milling and compounding in the usual manner after drying was obtained after only 9 hours reaction time.

Example 2

Proceeding as in Example 1 but employing 32 parts of styrene and 48 parts of butadiene, a solid, rubbery mass was obtained after 9 hours.

Example 3

38 parts by volume of water, 25 parts by volume of isopropyl alcohol, 24 parts by volume of 3% aqueous hydrogen peroxide, 100 parts by volume of 5% ammonium oleate aqueous solution, 32 parts of styrene and 48 parts of butadiene were shaken in a closed reaction vessel at 60° C. for 16 hours. A solid, rubbery mass was obtained on coagulation of the latex with dilute acetic acid.

Example 4

By employing an equal volume of ethyl Cellosolve (ethylene glycol monoethylether) or of butyl Carbitol (diethylene glycol monobutylether) in place of the isopropyl alcohol and proceeding as in Example 3, a solid, rubbery mass was obtained in each instance.

Example 5

38 parts by volume of water, 25 parts by volume of methyl alcohol, 24 parts by volume of 3% aqueous hydrogen peroxide, 100 parts by volume of 5% ammonium oleate aqueous solution, 20 parts of styrene and 60 parts of butadiene were shaken in a closed vessel at 60–65° C. for 9 hours. A solid, rubbery coagulum was obtained.

Example 6

38 parts by volume of water, 12 parts by volume of acetone, 24 parts by volume of 3% aqueous hydrogen peroxide, 50 parts by volume of 4% ammonium myristate aqueous solution and 40 parts of butadiene were shaken in a closed reaction vessel at 55–60° C. for 16 hours. 10 parts of dried polymer was obtained.

Working under the same conditions but without the addition of a solvent only 3.3 parts of dried polymer was obtained.

The acceleration of the polymerization reaction in accordance with my invention is further illustrated by the comparative results, appearing in the table below, obtained by subjecting to the process of the foregoing examples, in the presence and absence of a solvent for the soap, aqueous emulsions of a butadiene-styrene mixture prepared with various ammonium soaps. In carrying out the reactions, 32 parts by weight of styrene and 48 parts by weight of butadiene were in each instance shaken with 100 parts by volume of a 0.17 mol solution of the soap in a closed vessel at 55–60° C. for 16 hours. As the solvent, acetone was employed in the proportion of 12 parts by volume.

| Emulsifying Agent | Carbon Atoms in Fatty Acid | Weight of Solid Polymer Acetone Not Used | Weight of Solid Polymer Acetone Used |
|---|---|---|---|
| Ammonium caprylate | 8 | Oil | Oil |
| Ammonium caprate | 10 | 46 | 24 |
| Ammonium laurate | 12 | 52 | 75 |
| Ammonium myristate | 14 | 53 | 71 |
| Ammonium palmitate | 16 | 35 | 63 |
| Ammonium oleate | 18 | Oil | 77 |

It is apparent from the results in the table that with the exception of the caprylate and caprate soaps, the yield of solid rubbery polymer was increased with the use of the solvent in the polymerization. Thus the present invention is directly measurable in terms of increased yield of solid polymer per unit time of reaction.

I claim:

1. In the process of polymerizing a butadiene-1,3 hydrocarbon and styrene in aqueous emulsion in the presence of an emulsifying agent and a polymerization catalyst, the improvement which comprises conducting the polymerization in the presence of an emulsifying agent which is a water-soluble soap of a fatty acid having from 12 to 18 carbon atoms and of about 5–10% by volume on the total volume of the emulsion of an inert water-soluble organic solvent for the soap.

2. In the process of polymerizing butadiene and styrene in aqueous emulsion in the presence of an emulsifying agent and a polymerization catalyst, the improvement which comprises conducting the polymerization in the presence of an emulsifying agent which is a water-soluble soap of a fatty acid having from 12 to 18 carbon atoms and of about 5–10% by volume on the total volume of the emulsion of an inert water-soluble organic solvent for the soap.

3. The process as defined in claim 2, wherein the soap is a soluble salt of a fatty acid having 18 carbon atoms.

4. The process as defined in claim 2, wherein the soap is a soluble salt of myristic acid.

5. The process as defined in claim 2, wherein the soap is a soluble salt of palmitic acid.

6. The process as defined in claim 2, wherein the soap is a soluble salt of oleic acid.

7. The process as defined in claim 2, wherein the solvent for the soap is acetone.

8. The process as defined in claim 2, wherein the solvent for the soap is methyl alcohol.

9. The process as defined in claim 2, wherein the solvent for the soap is dioxane.

CARL E. BARNES.

REFERENCES CITED

The following references are of record in the file of this patent:

UNITED STATES PATENTS

| Number | Name | Date |
|---|---|---|
| 1,898,522 | Bock et al. | Feb. 21, 1933 |
| 1,938,731 | Tschunker | Dec. 12, 1933 |
| 2,118,945 | Reppe | May 31, 1938 |
| 2,264,173 | Collins | Nov. 25, 1941 |
| 2,264,191 | Starkweather | Nov. 25, 1941 |
| 2,300,056 | Meis | Oct. 27, 1942 |
| 2,380,476 | Stewart | July 31, 1945 |
| 2,391,817 | Blackburn | Dec. 25, 1945 |

OTHER REFERENCES

Snell, Ind. & Eng. Chem. vol. 35, No. 1, 1943, pages 107 and 114. (Copy in Scie. Libr.).

Mark et al., High Polymeric Reactions, vol. III of High Polymers, 1941, pages 81 to 83. (Copy in Div. 50.)